(12) United States Patent
Chan et al.

(10) Patent No.: US 7,042,688 B2
(45) Date of Patent: May 9, 2006

(54) NEUTRAL SWITCH TEST MECHANISM FOR A CIRCUIT INTERRUPTER

(75) Inventors: David Y. Chan, Bellerose, NY (US);
James Richter, Bayside, NY (US);
Gerald N. King, Deer Park, NY (US)

(73) Assignee: Leviton Manufacturing Co., Inc., Little Neck, NY (US)

(*) Notice: Subject to any disclaimer, the term of this patent is extended or adjusted under 35 U.S.C. 154(b) by 227 days.

(21) Appl. No.: 10/613,667

(22) Filed: Jul. 3, 2003

(65) Prior Publication Data

US 2004/0004795 A1 Jan. 8, 2004

Related U.S. Application Data

(63) Continuation of application No. 09/812,601, filed on Mar. 20, 2001, now abandoned.

(51) Int. Cl.
*H02H 3/00* (2006.01)

(52) U.S. Cl. .............................. 361/42; 361/44; 361/45; 361/115

(58) Field of Classification Search .................. 361/42, 361/44, 45, 50, 115
See application file for complete search history.

(56) References Cited

U.S. PATENT DOCUMENTS

| | | | | |
|---|---|---|---|---|
| 4,595,894 A | * | 6/1986 | Doyle et al. ................... | 335/18 |
| 4,851,951 A | * | 7/1989 | Foster, Jr. ..................... | 361/50 |
| 5,600,524 A | * | 2/1997 | Neiger et al. ................. | 361/42 |
| 6,040,967 A | * | 3/2000 | DiSalvo ........................ | 361/42 |

* cited by examiner

*Primary Examiner*—Stephen W. Jackson
(74) *Attorney, Agent, or Firm*—Paul J. Sutton

(57) ABSTRACT

Resettable circuit interrupting devices, such as GFCI devices, that include neutral fault test simulation.

1 Claim, 4 Drawing Sheets

NEUTRAL SWITCH TEST MECHANISM FOR A CIRCUIT INTERRUPTER

CROSS REFERENCE TO RELATED APPLICATIONS

This application is related to commonly owned application Ser. No. 09/812,288, filed Mar. 20, 2001, entitled Circuit Interrupting Device with Reset Lockout and Reverse Wiring Protection and Method of Manufacture, by inventors Steve Campolo, Nicholas L. DiSalvo and William R. Ziegler, which is a continuation-in-part of application Ser. No. 09/379,138 filed Aug. 20, 1999, now U.S. Pat. No. 6,246,558, which is a continuation-in-part of application Ser. No. 09/369,759 filed Aug. 6, 1999, now U.S. Pat. No. 6,282,070, which is a continuation-in-part of application Ser. No. 09/138,955, filed Aug. 24, 1998, now U.S. Pat. No. 6,040,967, all of which are incorporated herein in their entirety by reference.

This application is related to commonly owned application Ser. No. 09/812,875, filed Mar. 20, 2001, entitled Reset Lockout for Sliding Latch GFCI, by inventors Frantz Germain, Stephen Stewart, David Herzfeld, Steve Campolo, Nicholas L. DiSalvo and William R. Ziegler, which is a continuation-in-part of application Ser. No. 09/688,481 filed Oct. 16, 2000, now U.S. Pat. No. 6,437,700, all of which are incorporated herein in their entirety by reference.

This application is related to commonly owned application Ser. No. 09/812/624, filed Mar. 20, 2001, now U.S. Pat. No. 6,671,145, entitled Reset Lockout Mechanism and Independent Trip Mechanism for Center Latch Circuit Interrupting Device, by inventors Frantz Germain, Steven Stewart, Roger M. Bradley, David Chan, Nicholas L. DiSalvo and William R. Ziegler, herein incorporated by reference in its entirety.

This application is related to commonly owned application Ser. No. 09/379,140 filed Aug. 20, 1999, now U.S. Pat. No. 6,288,882, which is a continuation-in-part of application Ser. No. 09/369,759 filed Aug. 6, 1999, now U.S. Pat. No. 6,282,070, which is a continuation-part of application Ser. No. 09/138,955, filed Aug. 24, 1998, now U.S. Pat. No. 6,040,967, all of which are incorporated herein in their entirety by reference.

BACKGROUND

1. Field

The present application is directed to resettable circuit interrupting devices including without limitation ground fault circuit interrupters (GFCI's). Certain embodiments of the present application are directed to circuit interrupting devices using a neutral fault simulation. Certain embodiments of the present application are directed to circuit interrupting devices including a neutral to neutral test switch.

2. Description of the Related Art

Presently available GFCI devices, such as the device described in commonly owned U.S. Pat. No. 4,595,894, use an electrically activated trip mechanism to mechanically break an electrical connection between the line side and the load side of a GFCI. Such devices are resettable after they are tripped by, for example, the detection of a ground fault. In the device discussed in the '894 patent, the trip mechanism used to cause the mechanical breaking of the circuit (i.e., the conductive path between the line and load sides) includes a solenoid (or trip coil). A test button is used to test the trip mechanism and circuitry used to sense faults, and a reset button is used to reset the electrical connection between line and load sides.

Commonly owned application Ser. No. 09/138,955, filed Aug. 24, 1998, now U.S. Pat. No. 6,040,967, which is incorporated herein in its entirety by reference, describes a family of resettable circuit interrupting devices capable of locking out the reset portion of the device if certain conditions exist including the circuit interrupting portion being non-operational or if an open neutral condition, grounded neutral exists. Such device may use a simulated ground fault to initiate a device test.

Commonly owned application Ser. No. 09/379,138 filed Aug. 20, 1999, which is incorporated herein in its entirety by reference, describes a family of resettable circuit interrupting devices capable of independently tripping and protecting against reverse wiring.

SUMMARY

The present application relates to a resettable circuit interrupting devices that simulate a fault condition by simulating a neutral fault condition. The neutral fault may be simulated by connecting a load neutral line to a line neutral line using a switch to create a feedback path in the sensor that will trigger the circuit interrupter.

Furthermore, the neutral fault may be simulated using a third wire through the transformer or by connecting a load phase line to a line phase line.

The fault switch is preferably configured to facilitate mechanical connection between the line and load neutral paths. However, other known actuators are also contemplated.

BRIEF DESCRIPTION OF THE DRAWINGS

Preferred embodiments of the present application are described herein with reference to the drawings in which similar elements are given similar reference characters, wherein.

DETAILED DESCRIPTION OF EMBODIMENTS

Figure 1:
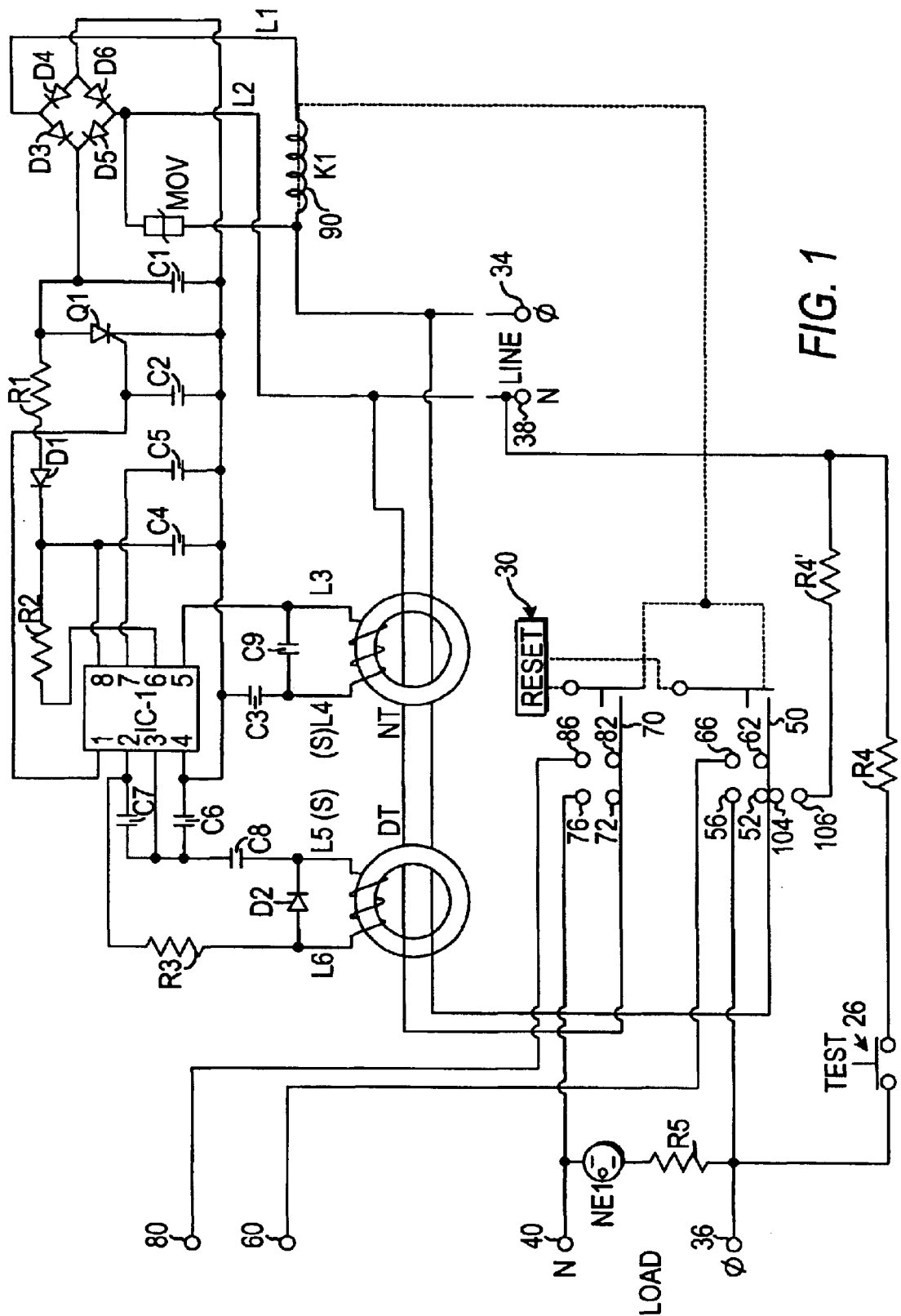
FIG. 1 is a schematic diagram of a GFCI having an electrical test and bridge circuit according to the present application.

The present application contemplates various types of circuit interrupting devices that are capable of breaking at least one conductive path at both a line side and a load side of the device. The conductive path is typically divided between a line side that connects to supplied electrical power and a load side that connects to one or more loads. As noted, the various devices in the family of resettable circuit interrupting devices include: ground fault circuit interrupters (GFCI's), arc fault circuit interrupters (AFCI's), immersion detection circuit interrupters (IDCI's), appliance leakage circuit interrupters (ALCI's) and equipment leakage circuit interrupters (ELCI's).

For the purpose of the present application, the structure or mechanisms used in the circuit interrupting devices, shown in the drawings and described hereinbelow, are incorporated into a GFCI receptacle suitable for installation in a single-gang junction box used in, for example, a residential electrical wiring system. However, the mechanisms according to the present application can be included in any of the various devices in the family of resettable circuit interrupting devices.

The GFCI receptacles described herein have line and load phase (or power) connections, line and load neutral connections and user accessible load phase and neutral connections. The connections permit external conductors or appliances to be connected to the device. These connections may be, for example, electrical fastening devices that secure or connect external conductors to the circuit interrupting device, as well as conduct electricity. Examples of such connections include binding screws, lugs, terminals and external plug connections.

The above-described features can be incorporated in any resettable circuit interrupting device having neutral fault protection, but for simplicity the descriptions herein are directed to GFCI receptacles.

In one embodiment, the GFCI receptacle has a circuit interrupting portion, a reset portion and a reset lockout as shown in commonly owned application Ser. No. 09/812,601.

Figure 4A:
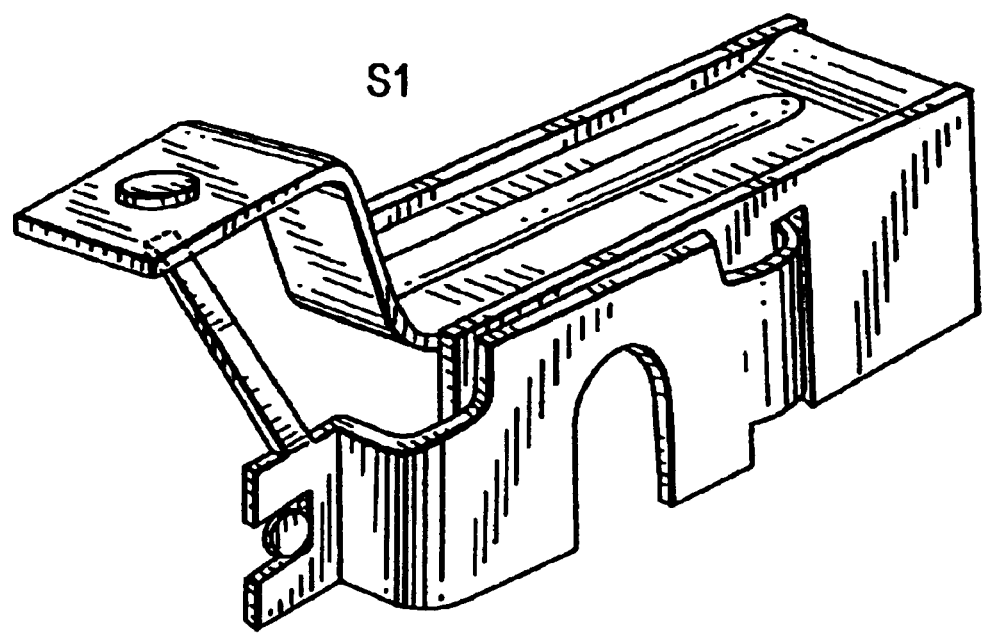
FIGS. 4a and 4B is a mechanical switch to effectuate a neutral fault simulation for a GFCI such as that as shown in application Ser. No. 09/812,601.
Figure 4B:
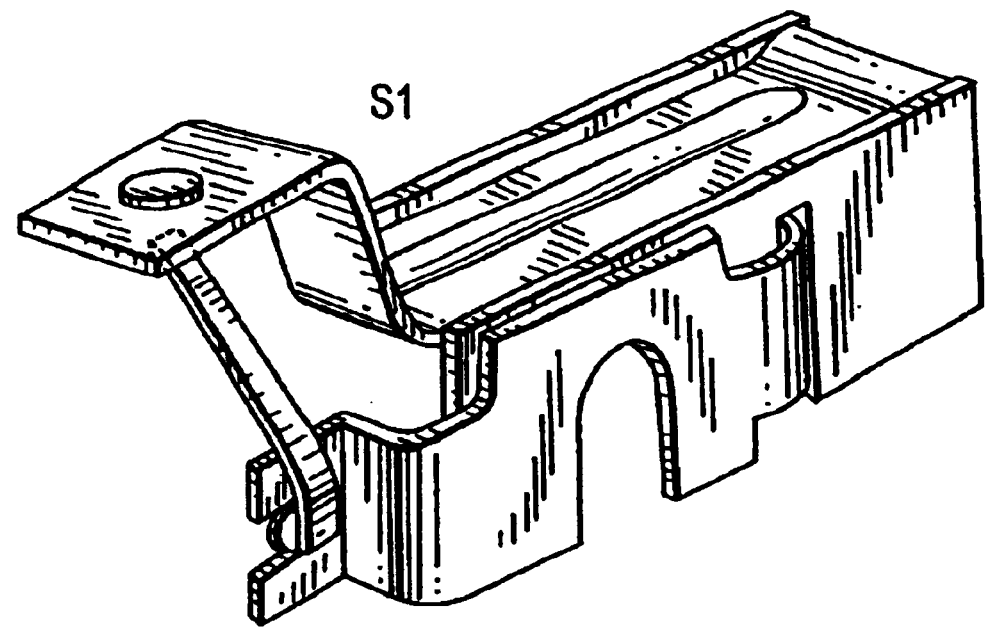

In an embodiment using a mechanical independent trip test button, the present invention utilizes a neutral fault simulation switch that allows resistor R4' of FIG. 1, 283 to be removed. A new switch such as that shown in FIGS. 4a and 4b will replace a neutral tab such that upon depressing the reset button, when the test is required, it will be accomplished using a neutral fault.

Referring to FIG. 1, a GFCI is described having an electrical test and bridge circuit according to the present application. As can be appreciated a test trip is accomplished by pushing button 26 which closes the test circuit through current limiting resistor R4 to create a simulated ground fault to trip the device.

Figure 2:
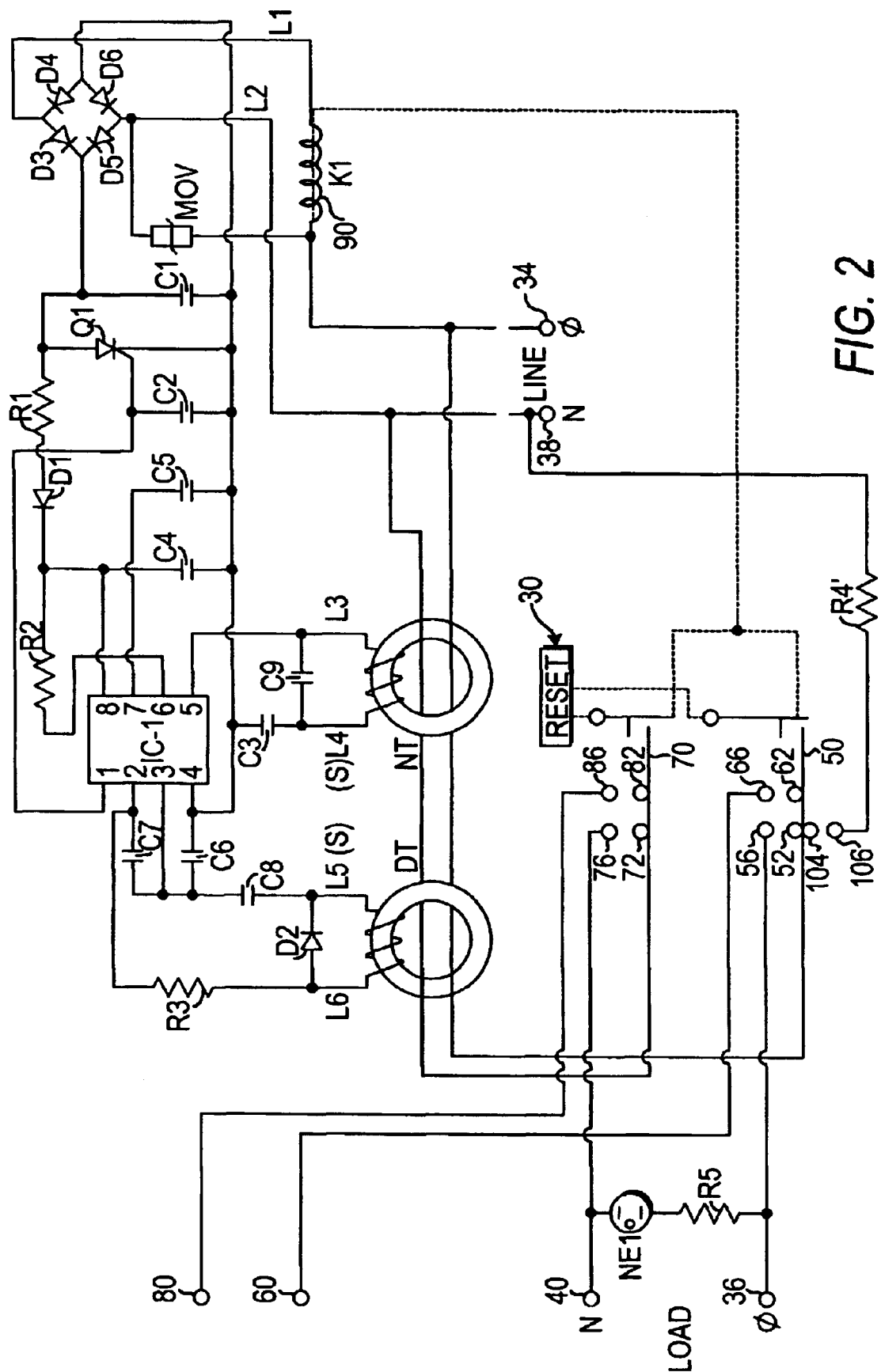
FIG. 2 is a schematic diagram of a GFCI having an independent trip such as a mechanical trip for a test button and an electrical ground fault simulation test for reset lockout according to the present application.

Referring to FIG. 2 a schematic diagram of a GFCI having an independent trip such as a mechanical trip for a test button and an electrical ground fault simulation test for reset lockout according to the present application is shown. As can be appreciated, the reset lockout test is accomplished by using a ground fault simulation through current limiting resistor R4'.

Figure 3:
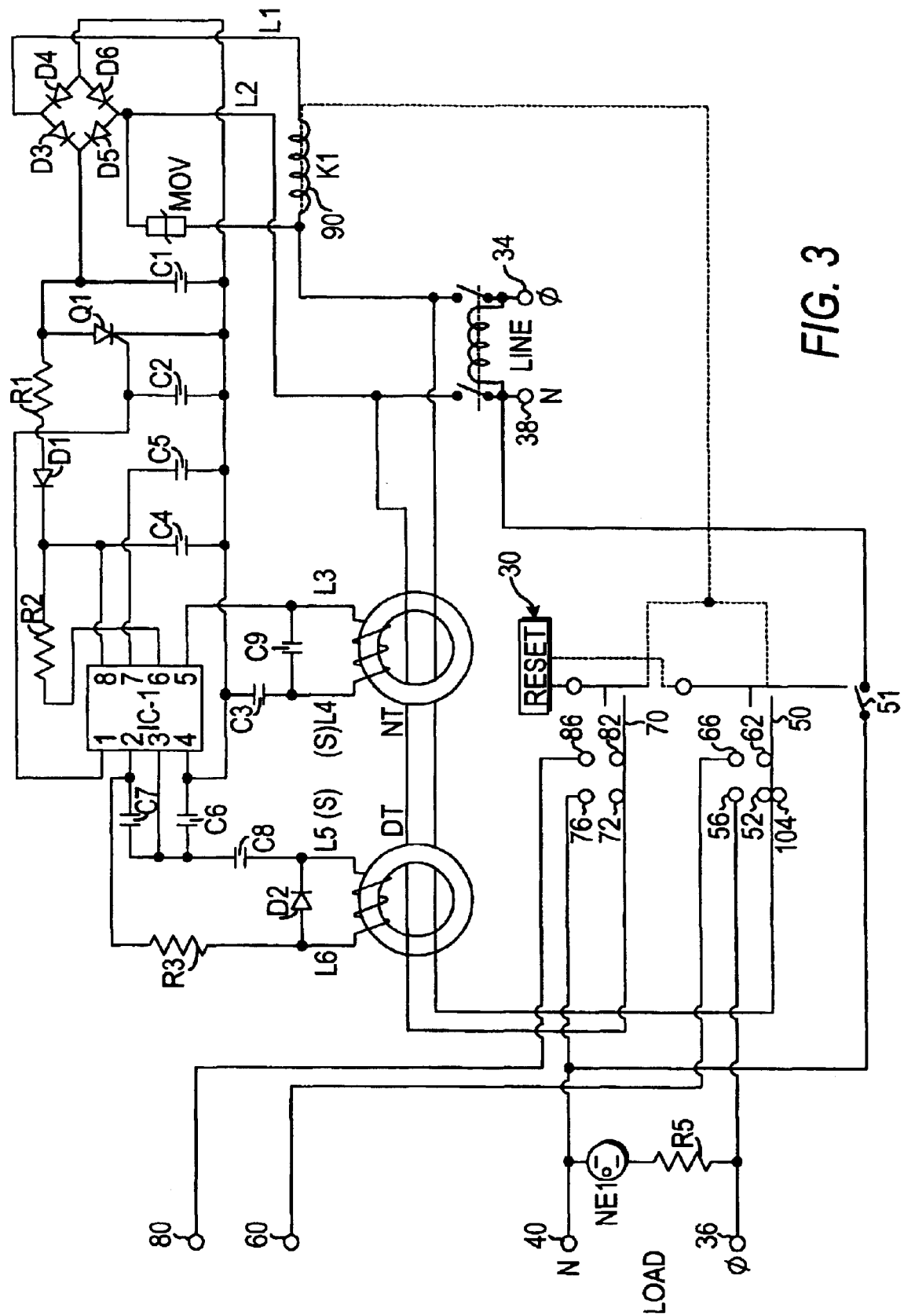
FIG. 3 is a schematic diagram of a GFCI having an independent trip such as a mechanical trip for a test button and a mechanical switch (electrical test) for a neutral fault simulation test for reset lockout according to the present application.

Referring to FIG. 3 a schematic diagram of a GFCI having an independent trip such as a mechanical trip for a test button and a mechanical switch (electrical test) for a neutral fault simulation test for reset lockout according to the present application is shown. As can be appreciated, the schematic shown has an independent mechanical trip for a test, but could have an electrical ground fault simulation test. Similarly, the test button may also fire a neutral fault test simulation. As shown the reset lockout test is accomplished by switch S1 closing and completing a circuit from the line neutral 38 to the load neutral 40. This circuit creates a feedback path that will trigger the device if it is working properly and the reset will be allowed. As can be appreciated, an open neutral fault can be protected against using a continuous duty solenoid K2 which will open the line side if power drops out such as an open neutral.

The neutral fault condition simulated is generally providing a low impedance path through the two transformers of the GFCI. As can be appreciated, a switch similar to S1 may accomplish a fault simulation by switching a circuit from the line phase 34 to the load phase 36.

Certain circuit interrupters do not allow convenient access to the line side. In such situations and others such as high current devices, a third sense line may be used. A third wire through the sense transformers to simulate a fault.

Referring to FIG. 4, an particular neutral fault simulation switch is shown that may be used with the GFCI devices shown above.

As noted, although the components used during circuit interrupting and device reset operations are electromechanical in nature, the present application also contemplates using electrical components, such as solid state switches and supporting circuitry, as well as other types of components capable or making and breaking electrical continuity in the conductive path.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed:

1. A circuit interrupting device comprising:

a housing;

a phase conductive path and a neutral conductive path each disposed at least partially within said housing between a line side and a load side, said phase conductive path terminating at a first connection capable of being electrically connected to a source of electricity, a second connection capable of conducting electricity to at least one load and a third connection capable of conducting electricity to at least one user accessible load, and said neutral conductive path terminating at a first connection capable of being electrically connected to a source of electricity, a second connection capable of providing a neutral connection to said at least one load and a third connection capable of providing a neutral connection to said at least one user accessible load;

a circuit interrupting portion disposed within said housing and configured to cause electrical discontinuity in said phase and neutral conductive paths between said line side and said load side upon the occurrence of a predetermined condition; and a reset portion disposed at least partially within said housing and configured to reestablish electrical continuity in said phase and neutral conductive paths; and said circuit interrupting device further comprising a reset lockout portion that prevents reestablishing electrical continuity in said phase and neutral conductive paths only if a neutral fault simulation test is successful.

* * * * *